(12) United States Patent
Schnur et al.

(10) Patent No.: US 6,958,889 B2
(45) Date of Patent: Oct. 25, 2005

(54) SLIDER WITH A COMPLIANT TRANSDUCER INTERFACE

(75) Inventors: Deborah S. Schnur, Minneapolis, MN (US); Zine-Eddine Boutaghou, Vadnais Heights, MN (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/008,228

(22) Filed: Nov. 7, 2001

(65) Prior Publication Data

US 2002/0075600 A1 Jun. 20, 2002

Related U.S. Application Data

(60) Provisional application No. 60/256,138, filed on Dec. 15, 2000.

(51) Int. Cl.[7] .................................................. G11B 5/60
(52) U.S. Cl. .................................................. 360/235.8
(58) Field of Search .............................. 360/234.3–237

(56) References Cited

U.S. PATENT DOCUMENTS

| | | | | |
|---|---|---|---|---|
| 4,605,977 A | * | 8/1986 | Matthews ................ 360/234.7 |
| 4,669,011 A | * | 5/1987 | Lemke ........................ 360/75 |
| 4,901,185 A | * | 2/1990 | Kubo et al. .............. 360/246.1 |
| 5,021,906 A | | 6/1991 | Chang et al. ................ 360/103 |
| 5,223,998 A | * | 6/1993 | Tokuyama et al. ........ 360/234.7 |
| 5,764,432 A | * | 6/1998 | Kasahara ...................... 360/75 |
| 5,943,189 A | * | 8/1999 | Boutaghou et al. ...... 360/234.7 |
| 5,991,113 A | * | 11/1999 | Meyer et al. .................. 360/75 |
| 6,069,769 A | * | 5/2000 | Dorius et al. ............. 360/235.6 |
| 6,181,531 B1 | * | 1/2001 | Koshikawa et al. ...... 360/294.4 |
| 6,289,564 B1 | * | 9/2001 | Novotny ..................... 29/25.35 |
| 6,344,949 B1 | * | 2/2002 | Albrecht et al. ......... 360/236.5 |
| 6,487,045 B1 | * | 11/2002 | Yanagisawa ............. 360/236.5 |
| 6,570,730 B1 | * | 5/2003 | Lewis et al. .................. 360/75 |
| 2002/0159192 A1 | | 10/2002 | Wada et al. |

* cited by examiner

*Primary Examiner*—Angel Castro
(74) *Attorney, Agent, or Firm*—Kinney & Lange, P.A.

(57) ABSTRACT

A slider is used for supporting a transducing head proximate a rotating disc. The slider includes a primary air bearing having a disc opposing face bounded by a leading edge and a first trailing edge. An air bearing surface is defined on the disc opposing face. The slider further includes a secondary air bearing having a disc opposing face bounded by a front edge and a second trailing edge. The air bearing surface is defined on the disc opposing face. The air bearing surface has a pad proximate the second trailing edge wherein the transducing head is located on the pad. An interface connects the secondary air bearing to the primary air bearing and the interface displaces the transducing head vertically with respect to the primary air bearing to maintain head media spacing (HMS) between the transducing head and the disc substantially constant as the slider flies above the disc.

20 Claims, 10 Drawing Sheets

SLIDER WITH A COMPLIANT TRANSDUCER INTERFACE

CROSS-REFERENCE TO RELATED APPLICATION(S)

This application claims priority from Provisional Application No. 60/256,138, filed Dec. 15, 2000, for "SLIDER WITH COMPLIANT TRANSDUCER INTERFACE" by Deborah S. Schnur, Zine-Eddine Boutaghou and Anthony P. Sannino.

BACKGROUND OF THE INVENTION

The present invention relates to an air bearing slider carrying a transducing head in a disc drive. More particularly, it relates to maintaining head media spacing (HMS) substantially constant between the transducing head and the disc.

Air bearing sliders have been extensively used in disc drives to appropriately position a transducing head above a rotating disc. In most high capacity storage applications, when the disc is at rest, the air bearing slider is in contact with the disc. During operation the disc rotates at high speeds, which generates a wind of air immediately adjacent to the flat surface of the disc. This wind acts upon a lower air bearing surface of the slider and generates a lift force directing the slider away from the disc and against a load beam causing the slider to fly at an ultra-low height above the disc. For the transducing head to read and write accurately, a specified HMS, or air bearing gap, must be maintained at the pole tip of the transducing head between the pole tip and the disc.

As disc storage systems are designed for greater and greater storage capacities, the density of concentric data tracks on a disc is increasing (that is, the size of data tracks and radial spacing between data tracks is decreasing). One aspect of achieving higher data storage densities in discs is operating the air bearing slider at ultra-low flying heights. The higher data storage (or recording) density requires the HMS between each transducing head and the rotating disc be reduced. As the HMS decreases, the amount of allowable HMS modulation decreases as well.

Typically the surface topography of the disc is rough and may have a waviness or a small frequency waviness called microwaviness. Microwaviness of the disc has a significant effect on HMS modulation. As the fly height between the slider and the disc becomes smaller and smaller, microwaviness causes a disturbance or vibration of the air bearing gap of the slider. Servo patterned media (SPM) is a disc where the servo patterns are not created magnetically, but rather by some other method. Typically stamping, or some other method, is used to create pits in the disc that represent the servo patterns. This rough and non-flat topography on the disc also causes the air bearing gap of the slider to modulate. When the air bearing gap modulates the transducing head cannot accurately read or write to and from the disc.

A slider flying over the disc responds globally to the changes in surface topography of the disc caused by microwaviness or SPM. Because the slider is a rigid body, the global response of the slider controls the local response of the transducing head, thereby resulting in HMS modulation. However, the global response of the slider to the topography is not well correlated to the local topography of the disc under the transducing head. Therefore, the HMS between the transducing head and the disc modulates resulting in inaccurate reading and writing of the disc.

There is a need in the art for a slider capable of maintaining the HMS substantially constant and minimizing the HMS modulation. Maintaining the HMS substantially constant between the transducing head and the disc permits the transducing head to read and write data accurately.

BRIEF SUMMARY OF THE INVENTION

The present invention relates to a slider for supporting a transducing head proximate a rotating disc. The slider includes a primary air bearing having a disc opposing face bounded by a leading edge and a first trailing edge. An air bearing surface is defined on the disc opposing face. The slider further includes a secondary air bearing having a disc opposing face bounded by a front edge and a second trailing edge. The air bearing surface is defined on the disc opposing face. The air bearing surface has a pad proximate the second trailing edge wherein the transducing head is located on the pad. An interface connects the secondary air bearing to the primary air bearing. The interface displaces the transducing head vertically with respect to the primary air bearing to maintain head media spacing (HMS) between the transducing head and the disc substantially constant as the slider flies above the disc.

DETAILED DESCRIPTION OF THE DRAWINGS

Figure 1:
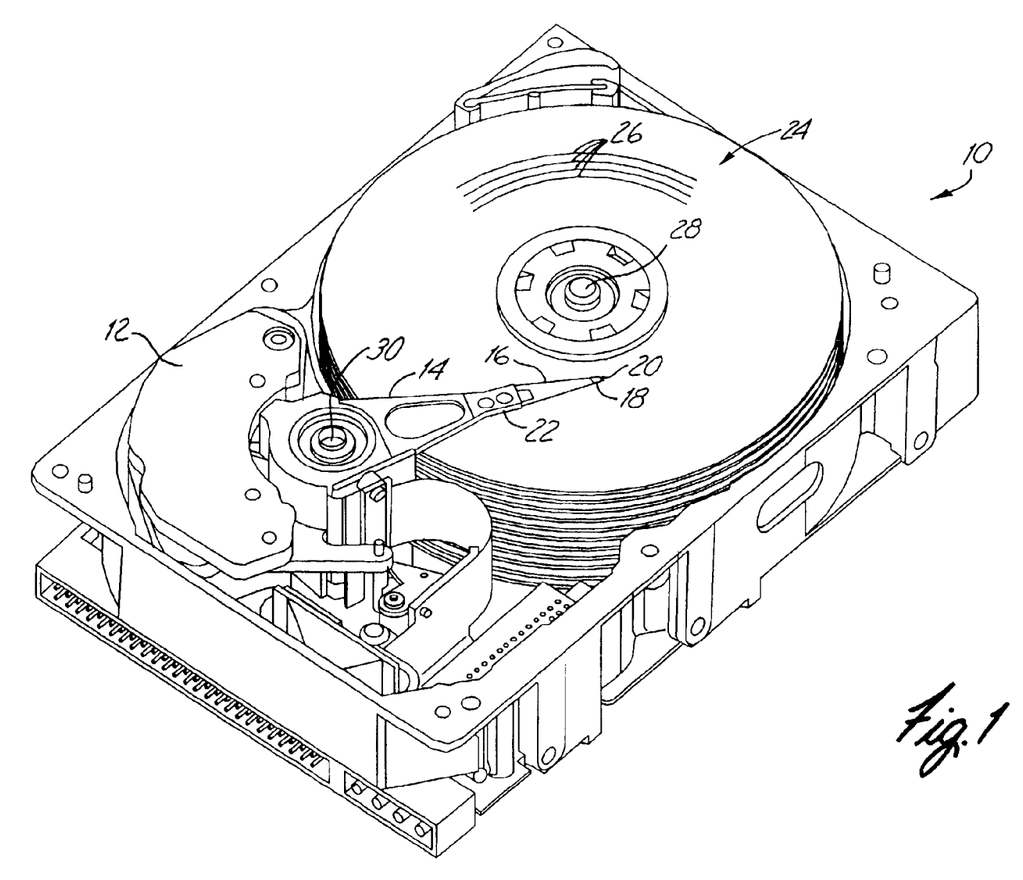
FIG. 1 shows a top perspective view of a disc drive actuation system for positioning a slider over tracks of a disc.

FIG. 1 shows a top perspective view of a disc drive actuation system 10 for positioning a transducing head (shown in FIG. 3) over a track of a disc as known in the prior art. The actuation system 10 includes a voice coil motor (VCM) 12, an actuator arm 14, a suspension 16, a flexure 18, and a slider 20. Slider 20 is connected to the distal end of suspension 16 by flexure 18. Suspension 16 is connected to actuator arm 14 at a head mounting block 22, while actuator arm 14 is coupled to VCM 12. As shown in FIG. 1, the disc drive assembly includes a disc 24, having a multiplicity of tracks 26, which rotate about an axis 28. During operation of the disc drive assembly, rotation of disc 24 generates air movement which is encountered by slider 20. This air movement acts to keep slider 20 aloft a small distance above the surface of disc 24 allowing the slider to fly above the surface of disc 24. VCM 12 is selectively operated to move actuator 14 around an axis 30 thereby moving suspension 16 and positioning the transducing head (not shown) carried by slider 20 between tracks 26 of disc 24. Proper positioning of the transducing head is necessary for reading and writing data on the concentric tracks 26 of disc 24.

Figure 2:
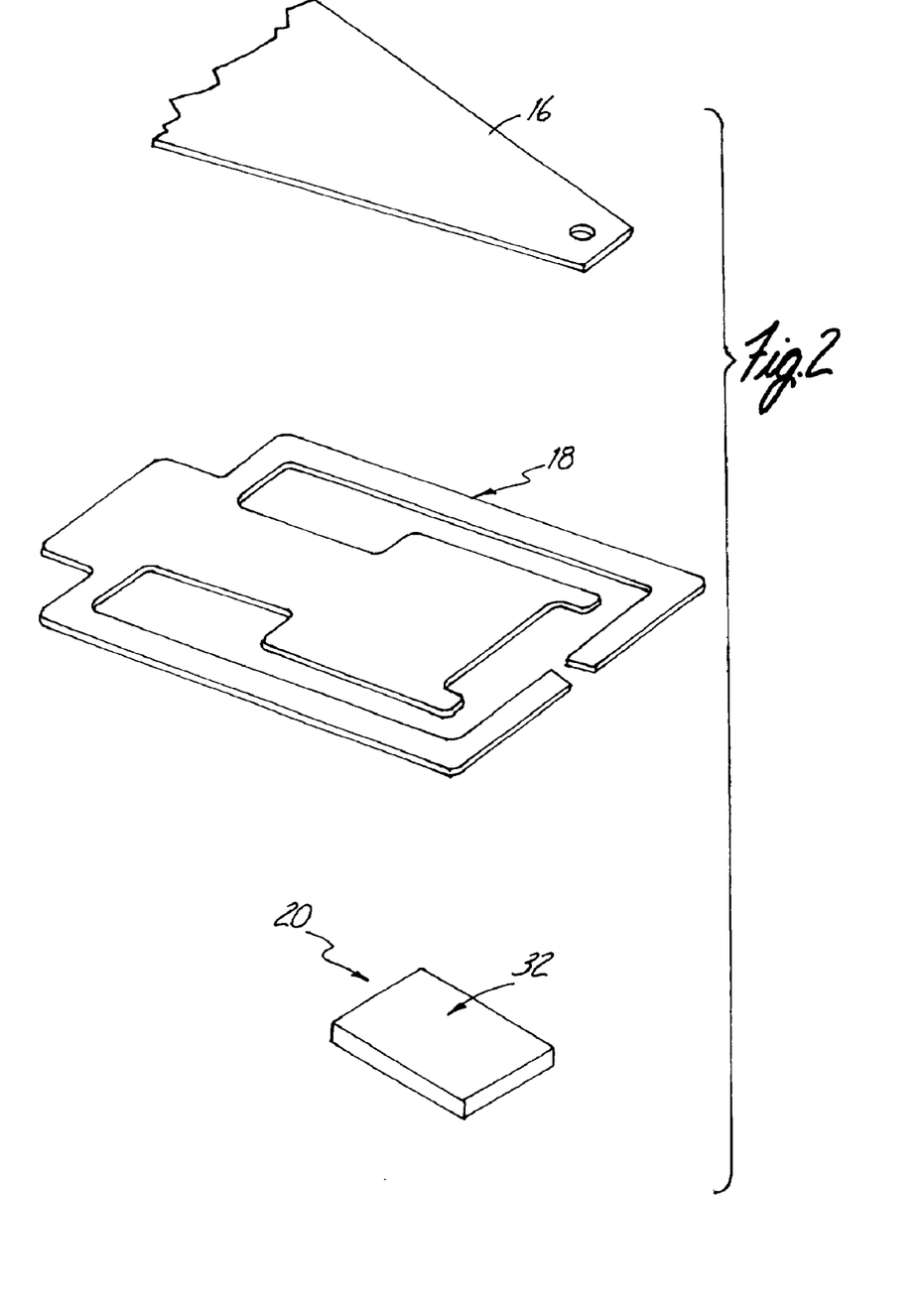
FIG. 2 shows an exploded perspective view of the distal portion of the disc drive actuation system of FIG. 1.

FIG. 2 is an exploded perceptive view of the distal portion of the disc drive actuation system 10 (shown in FIG. 1) as known in the prior art. Shown in FIG. 2, from top to bottom is suspension 16, flexure 18, and slider 20. Flexure 18 is attached to suspension 16 and slider 20 attaches to a bottom surface of flexure 18. Flexure 18 provides a spring connection between slider 20 and suspension 16. Air bearing slider 20 includes a disc opposing face (not shown) and a flexure opposing face 32. Flexure opposing face 32 is attached to the bottom surface of flexure 18. Flexure 18 is configured such that it allows slider 20 to move in pitch and roll directions. Many different types of flexures 18, also known as gimbals, are known to provide the spring connection allowing for pitch and roll movement of slider 20 and can be used with the present invention. During operation suspensions 16 and flexure 18 carrying slider 20 are all moved together as coarse positioning is performed by VCM 12 (FIG. 1) to move actuator arm 14 (FIG. 1). A transducing head (not shown) is carried by slider 20 and located on the disc opposing face (not shown) to read and write data to and from disc 24.

Figure 3:
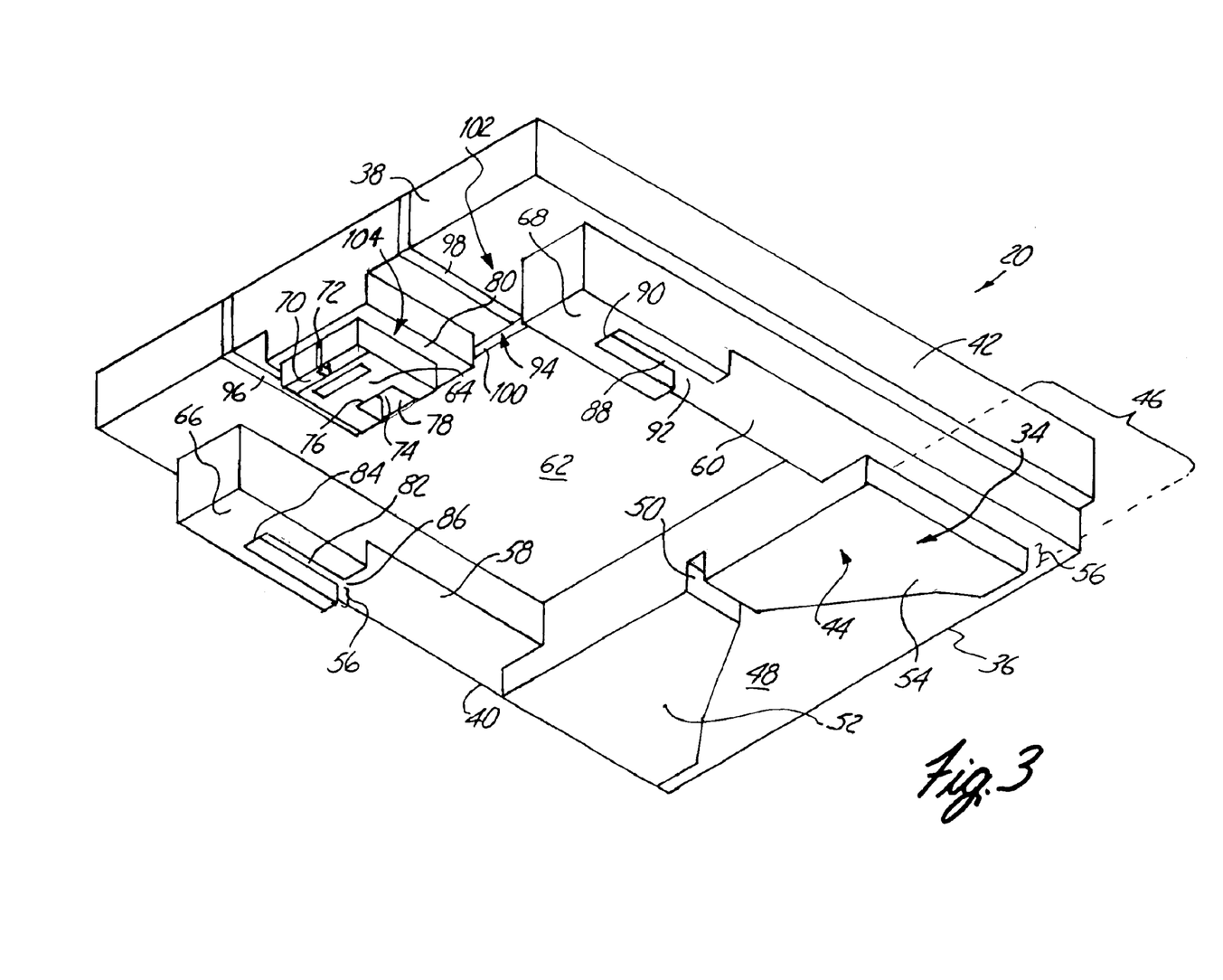
FIG. 3 shows a bottom perspective view of a first embodiment of a slider.
Figure 4:
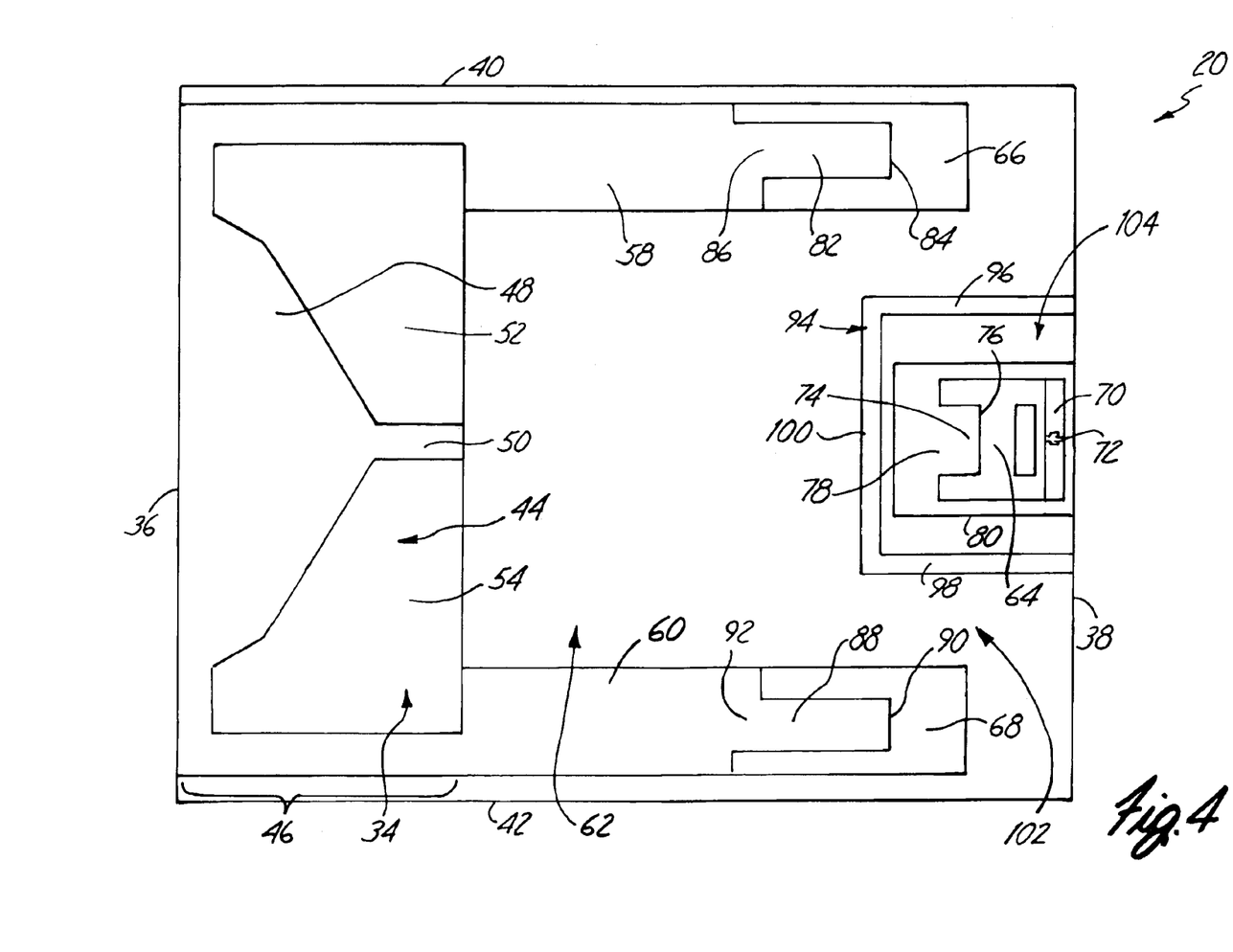
FIG. 4 shows a bottom view of the first embodiment of the slider.

FIG. 3 is a bottom perspective view of a first embodiment of slider 20 and FIG. 4 is a bottom view of the first embodiment of slider 20. Slider 20 has a disc opposing face 34 bounded by a leading edge 36, a trailing edge 38, a first side edge 40, and a second side edge 42. Leading edge 36 and trailing edge 38 are substantially parallel to each other, and two side edges 40 and 42 are substantially parallel to each other. Other configurations are possible for the slider body, including trapezoidal shapes. During operation, disc opposing face 34 is directed toward disc 24 (FIG. 1).

The contour of disc opposing face 34 of air bearing slider 20 has a significant effect on the flying characteristics of air bearing slider 20, and various contours have been proposed and used for air bearing sliders. Examples of two of these are included in U.S. Pat. No. 5,062,017 by Strong, et al. and U.S. Pat. No. 5,343,343 by Chapin, both of which are assigned to Seagate Technology, Inc. and are hereby incorporated by reference. The slider must maintain adequate roll pitch and normal stiffness over the predetermined concentric data track corresponding to a range of operating speeds and over rated predetermined range of sku angles. The slider must also maintain an ultra-low fly height over disc 24 while the disc drive is in operation. While slider 20 is flying over disc 24 (FIG. 1) during operation, head media spacing (HMS) between the transducing head and the disc must be maintained substantially constant to accurately read and write data to and from the disc.

Disc opposing face 34 of slider 20 defines an air bearing surface 44. Air bearing surface 44 is the reference level for slider 20, or slider body. A cross rail 46 is positioned behind leading edge 36 and extends from first side edge 40 to second side edge 42. Cross rail 46 has a front portion 48, a channel 50, and first and second rear portions 52 and 54, respectively. First rear portion 52 is located adjacent first side edge 40 and second rear portion 54 is located adjacent second side edge 42. Rear portions 52 and 54 typically have a height equal to air bearing surface 44, however, front portion 48 and channel 50 of cross rail 46 are recessed from air bearing surface 44 preferably at a step depth 56.

A first side rail 58 is positioned adjacent first side edge 40 and a second side rail 60 is positioned adjacent second side edge 42. Side rails 58 and 60 extend from cross rail 46 towards trailing edge 38. First side rail 58 and second side rail 60 are disposed substantially parallel to each other. Side rails 58 and 60 are preferably recessed from air bearing surface 44 at step depth 56. Step depth 56 is preferably between about 0.1 microns and about 1 micron. Other embodiments of slider 20 may have side walls at a height equal to air bearing surface 44.

A cavity 62 is positioned on disc opposing face 34. Cavity 62 is recessed from air bearing surface 44 at cavity depth (seen in FIG. 7). The cavity depth is preferably between about 1.0 microns to about 4.0 microns. First side rail 58 has an inner face facing cavity 62 and second side rail 60 has an inner face facing cavity 62. Cavity 62 is bounded by cross rail 46, inner face of first side rail 58, and inner face of second side rail 60.

A center pad 64 is positioned proximate to trailing edge 38, and a first side pad 66 and a second side pad 68 are positioned proximate first and second side rails 58 and 60, respectively. Each pad has a height equal to air bearing surface 44. Center pad 64 is located substantially along the longitudinal axis of slider 20. A transducing head 70 is located on center pad 64 substantially along the longitudinal axis of slider 20 and adjacent trailing edge 38. A pole tip 72 of transducing head 70 is located on air bearing surface 44 approximately where the longitudinal axis of slider 20 intersects trailing edge 38. First side pad 66 is located forward of trailing edge 38 adjacent first side edge 40. Preferably, first side pad 66 is connected to first side rail 58. Second side pad 68 is located forward of trailing edge 38 adjacent second side edge 42. Preferably, second side pad 68 is connected to second side rail 60.

A center trench 74, at step depth 56, is positioned within center pad 64. Center trench 74 has a back wall 76 formed by center pad 64, and an inlet 78. Inlet 78 lies closer to leading edge 36 than back wall 76, and inlet 78 is substantially parallel to leading edge 36. An outer perimeter 80, at step depth 56, surrounds center pad 64 and intersects with center trench 74 at inlet 78.

A first side trench 82, at step depth 56, extends into first side pad 66. First side trench 82 has a back wall 84 formed by first side pad 66, and an inlet 86. A second side trench 88, at step depth 56, extends into second side pad 68. Second side trench 88 has a back wall 90 formed by second side pad 68, and an inlet 92. Inlets 86 and 92 lie closer to leading edge 36 than back walls 84 and 90. Inlets 86 and 92 are disposed substantially parallel to leading edge 36.

Although slider 20 of FIG. 3 has a detailed disc opposing face 34 including center trench 74, side pads and side trenches, additional embodiments of slider 20 may include none or only some of these features. Furthermore, in additional embodiments of slider 20 center pad 64 is recessed from air bearing surface 44 at step depth 56.

An interface 94 substantially surrounds center pad 64. Interface 94 is located on disc opposing face 34 of slider 20. Interface 94 preferably has a height equal to cavity 62. In an alternate embodiment of slider 20, interface 94 abuts center pad 64. Interface 94 has a first section 96 and a second section 98 substantially parallel to first section 96. A central section 100 connects the first and second sections 96 and 98. The first and second sections 96 and 98 intersect trailing edge 38. Although center pad 64 of the first embodiment is square shape, other shapes are possible for the center pad, such as semi-circular, trapezoidal, or pentagonal. In addition, interface 94 may have other shapes as well. Furthermore, in other embodiments of slider 20 interface 94 may be located on center pad 64 and substantially surround transducing head 70. Finally, in other embodiments of slider 20, interface 94 may have a height greater than or less than cavity 62, such as a height equal to center pad 64.

Interface 94 is compliant and less stiff than slider body 20. Slider body 20 is preferably made of AlTiC, although other materials for the slider are contemplated. In the first embodiment of slider 20, interface 94 is made of a material different than the material for slider 20. The material comprising interface 94 is less stiff than the material comprising slider body 20, therefore resulting in interface 94 being more compliant than slider body 20. One method for forming interface 94 includes forming slider body 20, and then etching away an area where interface 94 is to be located and backfilling with a more compliant material.

Figure 5:
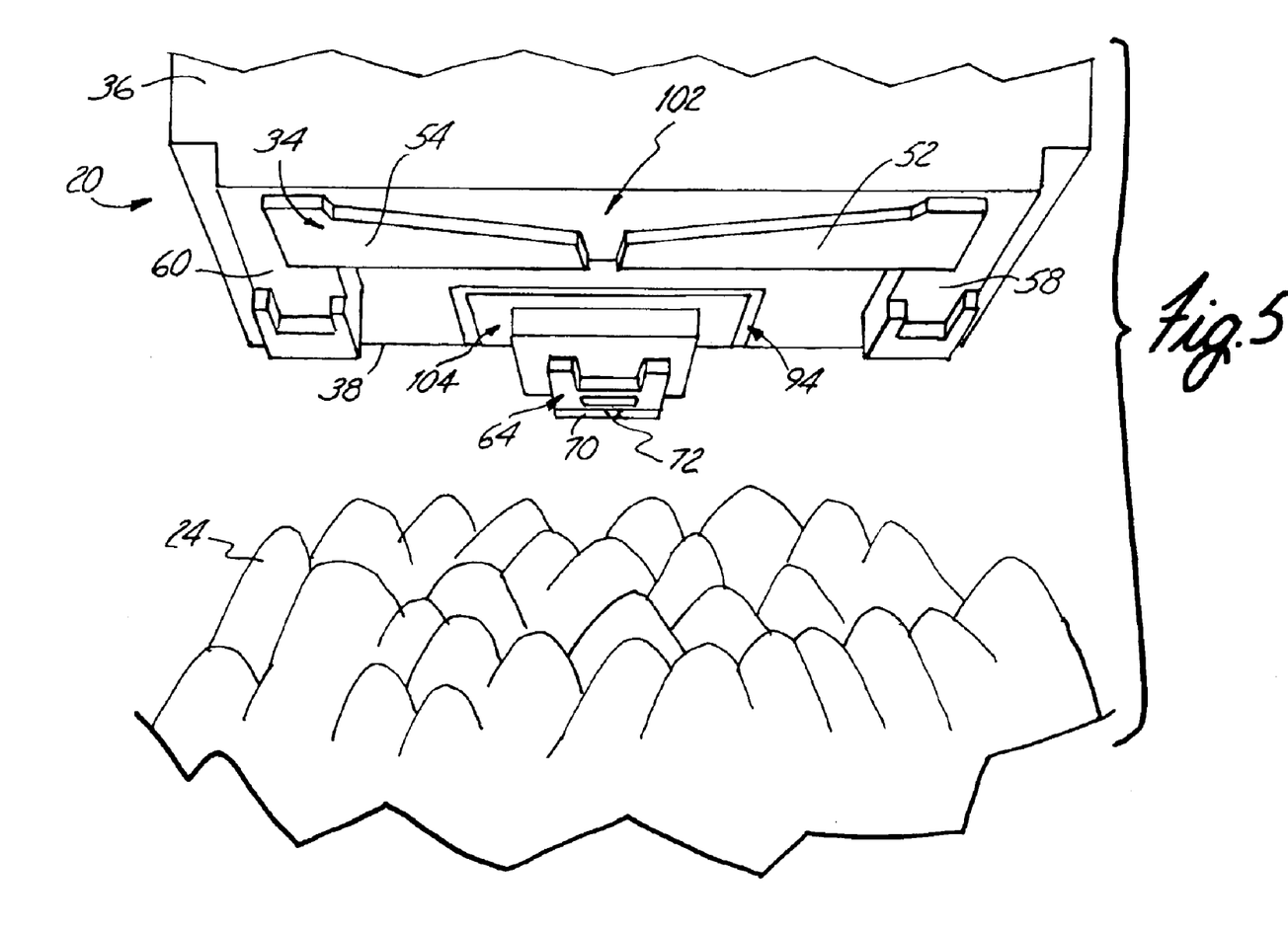
FIG. 5 shows a front perspective view of the first embodiment of the slider of FIG. 4.

FIG. 5 is a front perspective view of the first embodiment of slider 20 (shown in FIGS. 3 and 4) flying above disc 24. In operation slider 20 flies over the surface of disc 24 with disc opposing face 34 facing the disc. At start up, the disc rotates about its axis which generates a wind of air immediately adjacent the surface of the disc. For slider 20 to fly at an ultra-low height above the surface of the disc during operation, a lift force must be generated to lift and maintain slider 20 at a height above the disc.

While slider 20 is flying over the surface of the disc, various factors, such as mechanical shock and variations in the air flow, cause slider 20 to contact the disc or to not maintain a steady flying height. Additionally, variation in the surface topography of disc 24 has a significant effect on modulation of the HMS. As can be seen in FIG. 5, the surface topography of disc 24 is rough and not perfectly flat, which is the result of the disc manufacturing and texturing processes. The surface topography of disc 24 in FIG. 5 is greatly magnified and is not shown to scale. For example, the surface of disc 24 may have a small frequency waviness called microwaviness. As the fly height becomes smaller and smaller, microwaviness causes a disturbance or vibration of the HMS of slider 20. In another example, servo patterned media (SPM) is a type of disc used in the disc drive assembly. SPM is not patterned magnetically, but rather by stamping, or some other method, to create pits in the disc that represent the servo patterns. The varying topography on the disc causes the HMS of the slider to modulate. When the HMS of slider 20 vibrates, or modulates, transducing head 70 cannot accurately read or write data to or from the disc.

As slider 20 flies over the surface of disc 24, a specified HMS must be maintained at pole tip 72, that is between transducing head 70 and disc 24. As recording density increases, that is the density of concentric data tracks 26 on disc 24 increases, HMS decreases along with the allowable HMS modulation as slider 20 flies above disc 24. Variations in the HMS cause transducing head 70 to inaccurately read and write data to and from disc 24, or in some cases contact between the transducing head and the disc.

Sliders flying over discs having a rough surface topography respond globally to the changes in the surface of the disc. The global response of the slider to the topography underneath the slider is not well correlated to the local topography of the disc under the transducing head. Because the slider is a rigid body, the global response of the slider controls the local response of the transducing head. Basically, the pole tip follows the movement of the slider which causes the HMS between the transducing head and the disc to modulate, resulting in inaccurate reading and writing of the disc. The transducing head has a low tolerance to HMS modulation. HMS modulation results in the transducing head being too close to the disc or too far from the disc. If the transducing head is too close, contact occurs between the two. If the transducing head is too far from the disc, the transducing head cannot accurately read or write to or from the disc.

The present invention slider utilizes interface 94 to maintain the HMS substantially constant as slider 20 flies above disc 24 with a non-flat surface topography. Interface 94 is more compliant than slider body 20, thereby allowing center pad 64 and transducing head 70 to move separately from slider 20. As slider 20 flies above disc 24, slider 20 responds to the global topography of disc 24 and transducing head 70 can respond to the local surface topography of the disc directly underneath transducing head 70. Transducing head 70, and more specifically the area surrounded by interface 94, displaces vertically from the mean fly height of slider 20 in response to the local disc surface topography directly below transducing head 70. Interface 94 allows the transducing head 70 to follow the local topography of disc 24 beneath it while the rest of slider 20 follows the global topography of disc 24. Center pad 64 displaces vertically because of the compliancy of interface 94, which is more compliant than slider 20. Transducing head 70 follows the local disc surface topography and vertical movement of center pad 64 maintains the HMS substantially constant.

Interface 94 separates slider 20 into a primary air bearing 102 and a secondary air bearing 104. The area of slider 20 surrounded by interface 94 comprises secondary air bearing 104, including center pad 64 and transducing head 70. Secondary air bearing 104 is a semi-independent mini-air bearing distinct from the rest of slider 20, or primary air bearing 102. Interface 94 allows the secondary air bearing 104 to move semi-independently and follow the local topography of disc 24 beneath transducing head 70 while the rest of slider 20 follows the global topography of disc 24.

The stiffness of interface 94 can be chosen to reduce or eliminate specific frequency components of pole tip 72 or transducing head 70 that degrade the ability of the transducing head to follow the disc surface topography, and thereby minimize HMS modulation caused by a variety of sources, such as microwaviness and SPM, and TE pitch mode. Trailing edge (TE) pitch mode is the natural resonant frequency of the slider wherein the slider vibrates around an axis located at leading edge 36 (and perpendicular to the slider's longitudinal axis) with an angular motion, or rotation. The waviness or pits on the surface of the disc occur at certain frequencies. The disc surface topography can excite one of the resonant frequencies of the air bearing, such as TE pitch, leading edge (LE) pitch or roll. Thus, different discs cause different frequency responses in the transducing head that an operator desires to eliminate. Specific frequencies for example caused by microwaviness, SPM, or TE pitch mode, may require a certain stiffness in the interface to eliminate. Thus, the stiffness of interface 94 can be chosen for a specific frequency response to reduce or eliminate certain frequency components.

Figure 6:
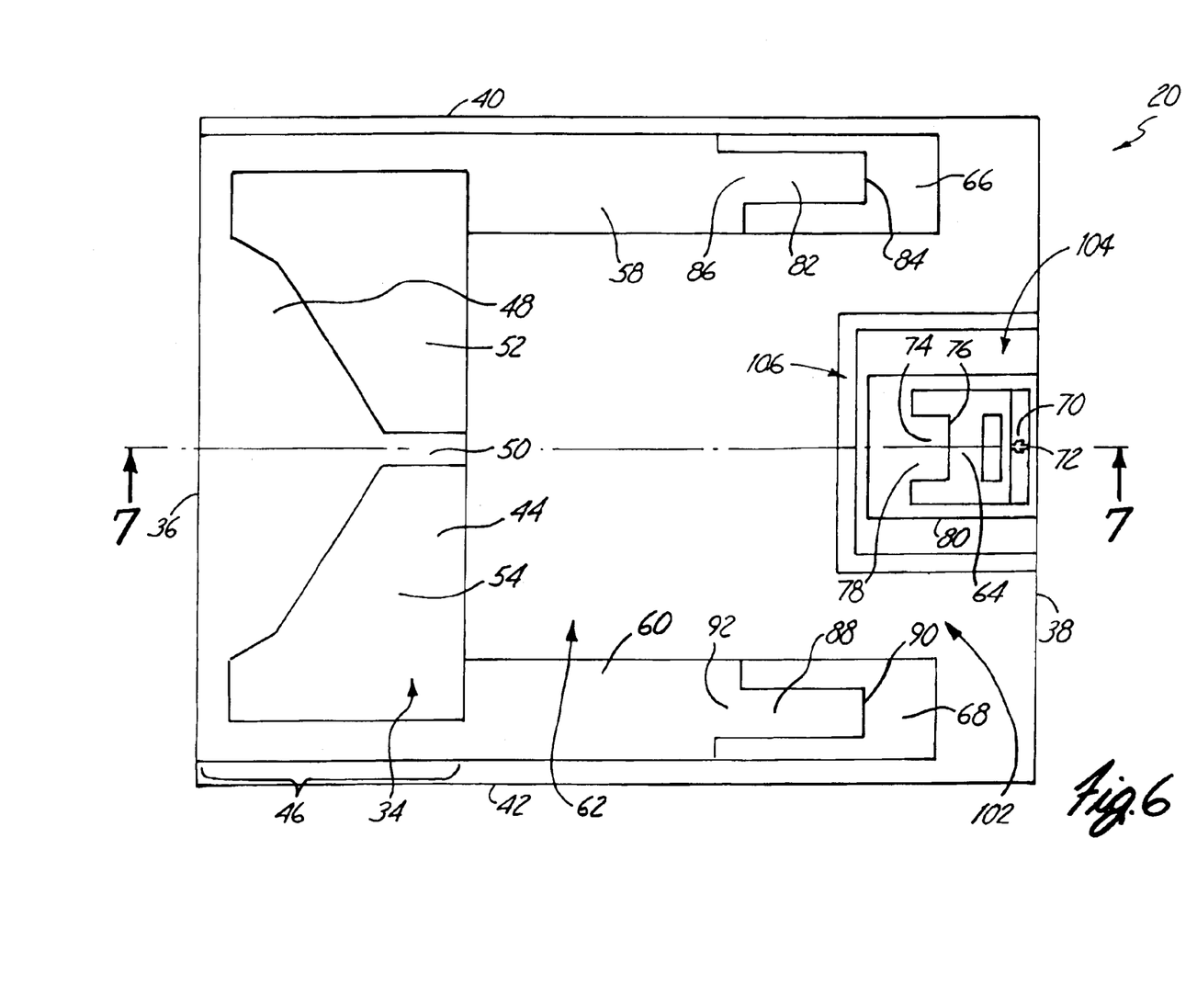
FIG. 6 shows a bottom view of a second embodiment of the slider.
Figure 7:
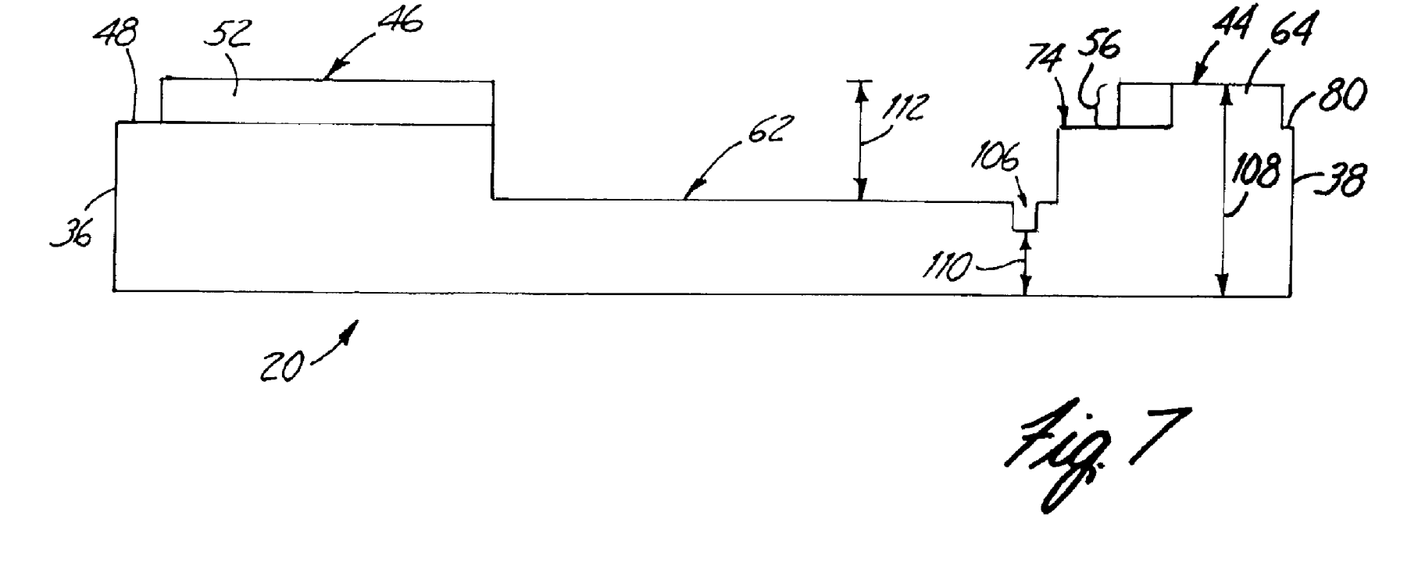
FIG. 7 shows a sectional view of the second embodiment of the slider taken along line 7—7 of FIG. 6.

FIG. 6 is a bottom view of a second embodiment of slider 20 and FIG. 7 is a sectional view of the second embodiment of slider 20 taken along line 7—7 of FIG. 6. The second embodiment of slider 20 has the same basic structure as described with the respect to the first embodiment slider in FIGS. 3 and 4. The second embodiment of slider 20 includes disc opposing face 34, cross rail 46, cavity 56, side walls 58 and 60, and center pad 64. An interface 106 substantially surrounds center pad 64 to provide a compliant interface for transducing head 70 and vertically displace center pad 64 in response to the local disc surface topography as slider 20 flies over disc 24.

Interface 106 is formed on disc opposing face 34 of slider 20 and substantially surrounds center pad 64. Interface 106 is recessed from center pad 64, which in the second embodiment of slider 20 center pad 64 has a height equal to air bearing surface 44. Center pad 64 of slider 20 has a thickness 108 and interface 106 is recessed from center pad 64 such that interface 106 has a thickness 110. Reducing the thickness of interface 106 from thickness 108 of center pad 64 is preferably done by etching. Interface 106 may be recessed any depth from air bearing surface 44. Thickness 110 of interface 106 will depend on its compliancy and the frequency component chosen to eliminate. Cavity 62 is recessed from air bearing surface 44 at a cavity depth 112. Preferably, interface 106 is recessed from cavity 62 such that thickness 110 is less thick than cavity 62. Because interface 106 is less thick than slider body 20, it is more compliant than slider body 20 and allows interface 106 to vertically displace pad 64 and transducing head 70 from the mean fly height of slider 20. Interface 106 is preferably made of the same material as slider body 20, however, interface 106 is thinner than the surrounding material, thereby resulting in a more compliant interface 106 with respect to slider 20.

Figure 8:
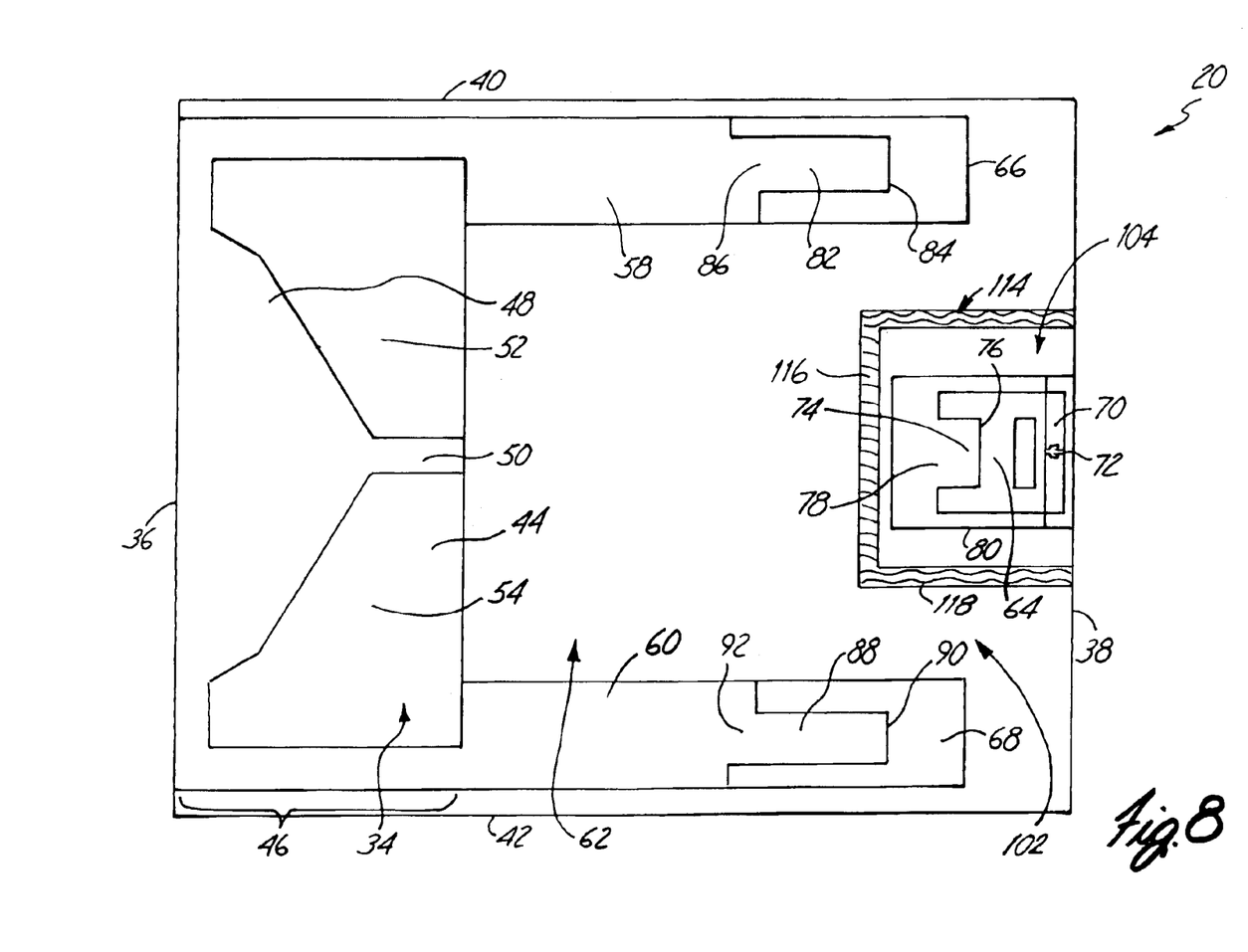
FIG. 8 shows a bottom view of a third embodiment of the slider.

FIG. 8 is a bottom view of a third embodiment of slider 20. The third embodiment of slider 20 includes disc opposing face 34, cross rail 46, cavity 62, side walls 58 and 60, and center pad 64. An interface 114 is formed on disc opposing face 34 of slider 20 and substantially surrounds center pad 64, and thereby transducing head 70.

Interface 114 has a height equal to or less than center pad 64, which is approximately equal to air bearing surface 44. Interface 114 has a first surface 116 which is at the same height as or lower than center pad 64. In the third embodiment of slider 20, slider body 20 is preferably made of Si. Springs 118 are etched into first surface 116 of interface 114 using MEMS fabrication methods. Springs 118 create a compliant interface 114 which is less stiff than slider body 20. Thus, interface 114 vertically displaces center pad 64 and transducing head 70 from the mean fly height of slider 20 such that the HMS is maintained substantially constant as slider 20 flies above the disc.

Figure 9:
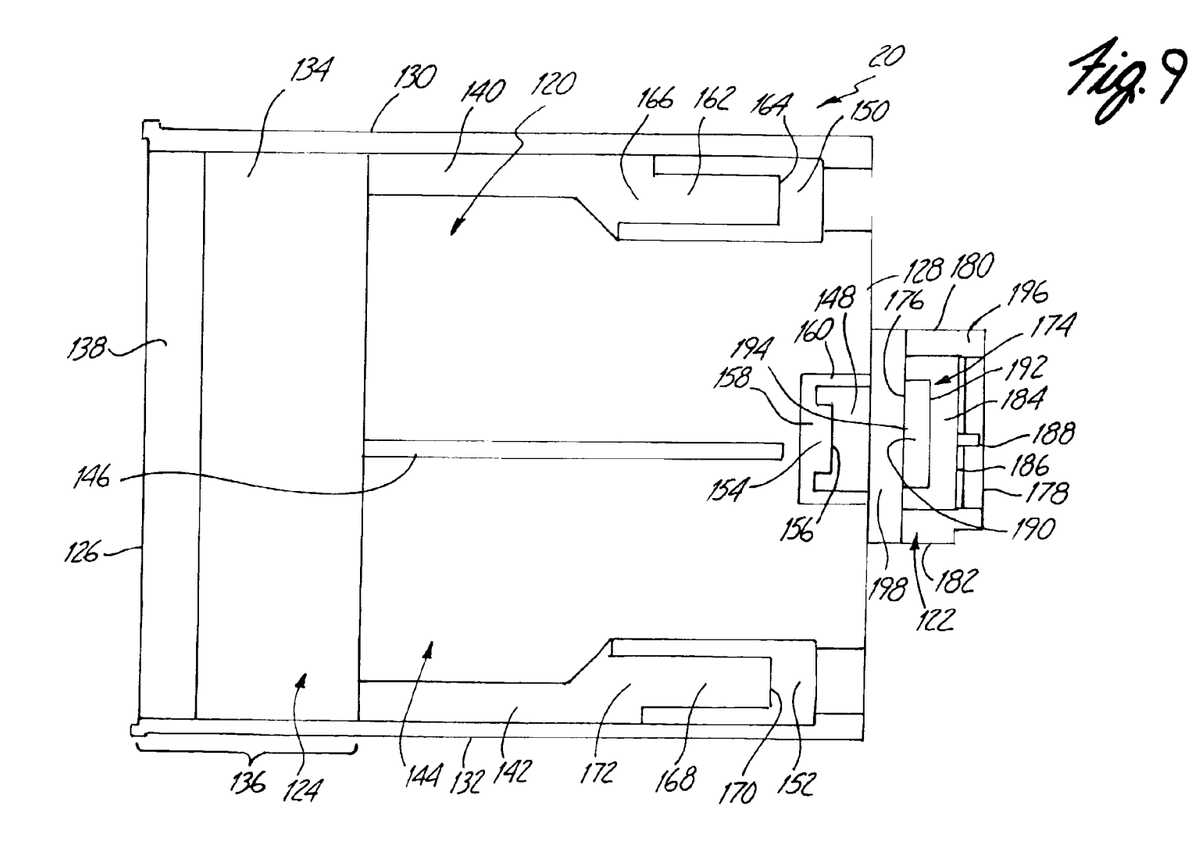
FIG. 9 is a top view of a fourth embodiment of the slider.

FIG. 9 is a top view of a fourth embodiment of slider 20. Slider 20 is comprised of a primary air bearing 120, or main air bearing, and a secondary air bearing 122, or follower air bearing. Primary air bearing 120 has a disc opposing face 124 bounded by a leading edge 126, a rear edge 128, a first side edge 130, and a second side edge 132. Leading edge 126 and rear edge 128 are substantially parallel to each other, and two side edges 130 and 132 are substantially parallel to each other. Other configurations are possible for the slider body, including trapezoidal shapes. During operation, disc opposing face 124 is directed toward disc 24 (FIG. 1). Disc opposing face 124 of primary air bearing 120 defines an air bearing surface 134.

A cross rail 136 is positioned behind leading edge 126 and extends from first side edge 130 to second side edge 132. Cross rail 136 typically has a height equal to air bearing surface 134, however a front portion 138 of cross rail 136 is recessed from air bearing surface 134 at a step depth.

A first side rail 140 is positioned adjacent first side edge 130 and a second side rail 142 is positioned adjacent second side edge 132. Side rails 140 and 142 extend from cross rail 136 towards rear edge 128. First side rail 140 and second side rail 142 are disposed substantially parallel to each other. Side rails 140 and 142 are preferably recessed from air bearing surface 134 at the step depth. The step depth is preferably between about 0.1 microns and about 1 micron. Other embodiments of primary air bearing 120 may have side walls at a height equal to air bearing surface 134.

A cavity 144 is positioned on disc opposing face 124. Cavity 144 is recessed from air bearing surface 134 at a cavity depth. The cavity depth is preferably between about 1.0 microns to about 4.0 microns. First side rail 140 has an inner face facing cavity 144 and second side rail 142 has an inner face facing cavity 144. Cavity 144 is bounded by cross rail 136, inner face of first side rail 140, and inner face of second side rail 142.

A center rail 146 is positioned within cavity 144 and lies substantially along the longitudinal axis of primary air bearing 120. Center rail 146 extends from cross rail 136 and extends towards rear edge 128. Center rail 146 is preferably recessed from air bearing surface 134 at the step depth. However, other embodiments of primary air bearing 120 may not include the center rail or the center rail has a height equal to air bearing surface 134.

A center pad 148, a first side pad 150 and a second side pad 152 are positioned proximate to rear edge 128. Each pad has a height equal to air bearing surface 134. Center pad 148 is located substantially along the longitudinal axis of primary air bearing 120. First side pad 150 is located forward of rear edge 128 adjacent first side edge 130. Preferably, first side pad 150 is connected to first side rail 140. Second side pad 152 is located forward of rear edge 128 adjacent second side edge 132. Preferably, second side pad 152 is connected to second side rail 142.

A center trench 154, at the step depth, is positioned within center pad 148. Center trench 154 has a back wall 156 formed by center pad 148, and an inlet 158. Inlet 158 lies closer to leading edge 126 than back wall 156, and inlet 158 is substantially parallel to leading edge 126. An outer perimeter 160, at the step depth, surrounds center pad 148 and intersects with center trench 154 at inlet 158.

A first side trench 162, at the step depth, extends into first side pad 150. First side trench 162 has a back wall 164 formed by first side pad 150, and an inlet 166. A second side trench 168, at the step depth, extends into second side pad 152. Second side trench 168 has a back wall 170 formed by second side pad 152, and an inlet 172. Inlets 166 and 172 lie closer to leading edge 126 than back walls 164 and 170. Inlets 166 and 172 are disposed substantially parallel to leading edge 126.

Although primary air bearing 120 of slider 20 shown in FIG. 9 has a detailed disc opposing face 124 including center trench 154, side pads and side trenches, additional embodiments of primary air bearing 120 may include none or only some of these features. Furthermore, in additional embodiments of primary air bearing 120, center pad 148 is recessed from air bearing surface 134 at the step depth.

Secondary air bearing 122 has a disc opposing face 174 bounded by a front edge 176, a trailing edge 178, a first side edge 180, and a second side edge 182. Front edge 176 and trailing edge 178 are substantially parallel to each other, and two side edges 180 and 182 are substantially parallel to each other. Other configurations are possible for the slider body, including trapezoidal shapes. During operation, disc opposing face 174 is directed toward disc 24 (FIG. 1).

A center pad 184 is positioned proximate to trailing edge 178 and has a height equal to air bearing surface 134. Center pad 184 is located substantially along the longitudinal axis of secondary air bearing 122. A transducing head 186 is located on center pad 184 substantially along the longitudinal axis of secondary air bearing 122 and adjacent trailing edge 178. A pole tip 188 of transducing head 186 is located on air bearing surface 134 approximately where the longitudinal axis of secondary air bearing 122 intersects trailing edge 178.

A center trench 190, at the step depth, is positioned within center pad 184. Center trench 190 has a back wall 192 formed by center pad 184, and an inlet 194. Inlet 194 lies closer to front edge 176 than back wall 192, and inlet 194 is substantially parallel to front edge 176. An outer perimeter 196, at the step depth, surrounds center pad 184 and intersects with center trench 190 at inlet 194.

A set of springs 198 (only one is shown in FIG. 9) connects primary air bearing 120 to secondary air bearing 122. Springs 198 is preferably a static spring and can also be seen in FIG. 10, discussed below. Springs 198 connect rear edge 128 of primary air bearing 120 to front edge 176 of secondary air bearing 122. Preferably secondary air bearing 122 is placed adjacent primary air bearing 120 such that their longitudinal axes intersect. Springs 198 permit secondary air bearing 122, and thereby transducing head 186 to vertically displace from the mean fly height of slider 20 such that the HMS is maintained substantially constant as slider 20 flies above disc 24.

Figure 10:
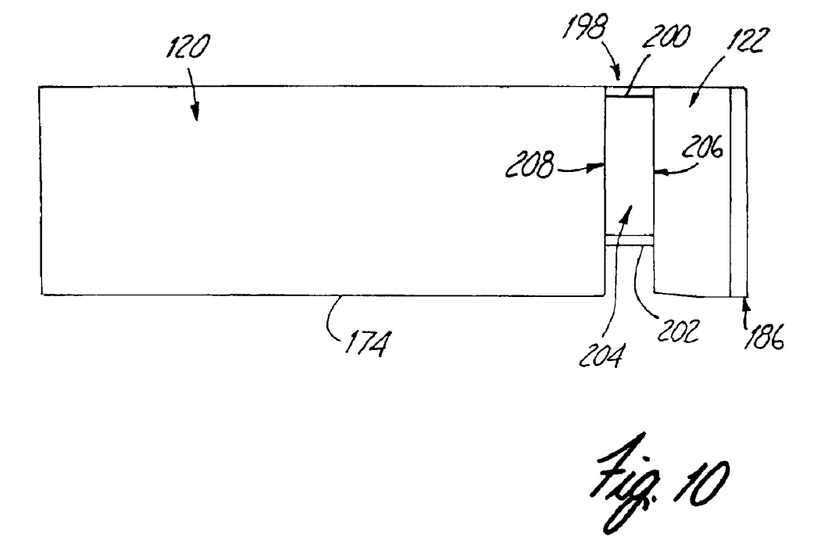
FIG. 10 is a side view of the fourth embodiment of the slider.

FIG. 10 is a side view of a fourth embodiment of slider 20. Spring 198 is comprised of an upper spring 200 and a lower spring 202. Springs 200 and 202 are static and passive. A gap 204 is formed between upper and lower springs 200 and 202. Gap 204 is defined by upper spring 200, a front face 206 of secondary air bearing 122, lower spring 202 and a rear face 208 of primary air bearing 120. The use of springs 200 and 202 in the fourth embodiment of slider 20 creates a spring loaded air bearing to compensate for fly height variations. The spring resonant mode is low enough to allow secondary air bearing 122, and thereby transducing head 186, to compensate for microwaviness and frequency variations in the disc surface topography. The fourth embodiment of slider 20 is a self-compensating mechanism that can be made to act as a vibro-isolator by moving the spring resonance above or below the air bearing modes.

Slider 20 utilizes springs 200 and 202 to maintain the HMS substantially constant as slider 20 flies above the disc with a non-flat surface topography. Springs 200 and 202 are more compliant than primary air bearing 120, thereby allowing secondary air bearing 122 (most importantly, center pad 184 and transducing head 186) to move semi-independently from primary air bearing 120. As slider 20 flies above the disc, slider 20 responds to the global topography of the disc and secondary air bearing 122 responds to the local surface topography of the disc directly underneath transducing head 186. Secondary air bearing 122, and more importantly transducing head 186, displaces vertically from the mean fly height of slider 20 in response to the local disc surface topography directly below transducing head 186. Springs 200 and 202 allow the transducing head 186 to follow the local topography of the disc beneath it while the rest of slider 20, i.e. primary air bearing 120 follows the global topography of the disc. Secondary air bearing 122 displaces vertically because of the compliancy of springs 198, which is more compliant than slider 20 and primary air bearing 120. Transducing head 186 follows the local disc surface topography and vertical movement of center pad 184 to maintain the HMS substantially constant.

The stiffness and spring resonant mode of springs 200 and 202 is preferably chosen to reduce or eliminate specific frequency components of transducing head 186 or pole tip 188 that degrade the ability of the transducing head to follow the disc surface topography, and thereby minimize HMS modulation caused by a variety of sources, such as microwaviness and SPM, and TE pitch mode. The microwaviness or pits on the surface of the disc occur at certain frequencies. The disc topography can excite the resonant frequency of slider 20 and different discs cause different frequency responses in the transducing head that an operator desires to eliminate. Specific frequencies, for example, caused by microwaviness, SPM, or TE pitch mode, may require a certain spring resonant mode in the spring to eliminate. Thus, the stiffness of springs 200 and 202 can be chosen for a specific frequency response to reduce or eliminate certain frequency components. Preferably the spring resonant mode of springs 200 and 202 is lower than the microwaviness frequency or frequency generate by the disc so that the springs attenuate or eliminate the frequency components.

Figure 11:
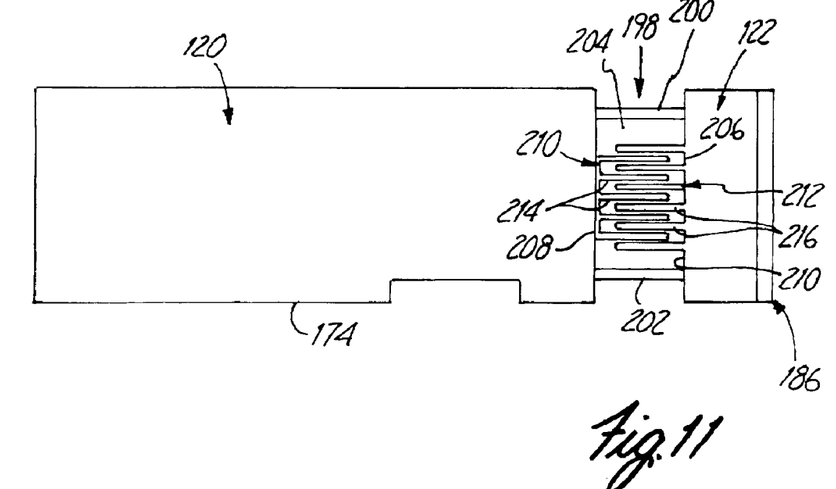
FIG. 11 is a side view of a fifth embodiment of the slider.

FIG. 11 is a side view of the fifth embodiment of slider 20. The fifth embodiment of slider 20 has the same basic structure as described with the respect to the fourth embodiment slider in FIGS. 9 and 10. The fifth embodiment of slider 20 includes upper spring 200 and lower spring 202 with gap 204 formed between upper and lower springs 200 and 202.

A first actuation comb 210 is attached to rear face 208 of primary air bearing 120 and extend into gap 204. A second actuation comb 212 is attached to front face 206 of secondary air bearing 122 and extends into gap 204. Preferably, the actuation combs are electro-static. First actuation comb 210 has a plurality of tines 214 and second actuation comb 212 has a plurality of tines 216. Preferably, first comb 210 is offset from second comb 212 such that tines 214 and 216 are interwoven in a zipper-like fashion.

The electro-static actuation combs 210 and 212 are preferably used for actuation purposes. Tines 214 of first comb 210 have one polarity and tines 216 of second comb 212 have a different polarity. The actuation combs create an electrical field or an attraction force between the primary and secondary air bearings 120 and 122 that vertically displaces secondary air bearing 122 with respect to primary air bearing 120. The attraction force will generate a reduction or increase in fly height depending on the disc surface topography. The electro-static combs compensate for fly height variation due to processing and, furthermore, due to thermal pole tip recession encountered in the utilization of silicon as the material for slider 20.

The ability to maintain HMS between a transducing head and a disc substantially constant permits the transducing head to read and write accurately from the disc. Because the surface topography of discs is typically non-flat, HMS modulation occurs between the transducing head and the disc as a slider flies above the disc. The present invention is a compliant interface substantially surrounding a portion of the slider carrying the transducing head, or at the least substantially surrounding the transducing head. The interface is more compliant, or less stiff, than the slider. Thus, the transducing head can vertically displace from the mean fly height of the slider in response to the disc's local surface topography directly underneath the transducing head. The stiffness of the interface can be chosen for a specific frequency response to reduce or eliminate certain frequency components. The ability of the transducing head to respond to the local surface topography of the disc minimizes or eliminates HMS modulation, thereby resulting in a substantially constant HMS.

Although the present invention has been described with reference to preferred embodiments, workers skilled in the art will recognize that changes may be made in form and detail without departing from the spirit and scope of the invention. For example, the stiffness of the interface can be varied by the selection of material for the interface, depth or thickness of the interface or number of springs on the interface.

What is claimed is:

1. A slider for supporting a transducing head proximate a rotating disc, the slider comprising:
   a slider body having a disc opposing face bounded by a leading edge and a trailing edge, the slider body having a longitudinal axis;
   an air bearing surface defined on the disc opposing face, the air bearing surface having a pad proximate the trailing edge wherein the transducing head is located on the pad; and
   an interface defined on the disc opposing face of the slider body and substantially surrounding the transducing head wherein the interface displaces the transducing head vertically with respect to the slider body in response to surface topography of the disc to maintain head media spacing (HMS) between the transducing head and the disc at a substantially constant separation distance as the slider flies above the disc.

2. The slider of claim 1 wherein the interface is less stiff than the slider body.

3. The slider of claim 1 wherein the slider body comprises a first material and the interface comprises a second material, the first material being more stiff than the second material.

4. The slider of claim 1 wherein the interface has a first surface at the disc opposing face of the slider body, and the slider further comprises at least one spring etched into the first surface of the interface.

5. The slider of claim 1 wherein the slider body has a first thickness and the interface has a second thickness, the first thickness being greater than the second thickness.

6. A slider for supporting a transducing head with respect to a surface, the slider comprising:
   (a) a primary air bearing;
   (b) a secondary air bearing comprising a transducing head; and
   (c) a compliant interface that connects the primary air bearing and the secondary air bearing, wherein the compliant interface reacts to topography of the surface such that the transducing head moves vertically with respect to the primary air bearing to maintain a substantially constant head media spacing between the transducing head and the surface.

7. The slider of claim 6 wherein the compliant interface is less stiff than the primary air bearing.

8. The slider of claim 6 wherein the primary and secondary air bearings comprise a first material and the compliant interface comprises a second material, the first material being more stiff than the second material.

9. The slider of claim 6 wherein the compliant interface has a first surface at a surface opposing face of the primary air bearing, and the slider further comprises at least one spring etched into the first surface of the compliant interface.

10. The slider of claim 6 wherein the primary and secondary air bearings have a first thickness and the compliant interface has a second thickness, the first thickness being greater than the second thickness.

11. The slider of claim 6 wherein the surface is a disc surface and the secondary air bearing modulates in response to local disc surface topography to maintain the head media spacing substantially constant.

12. The slider of claim 6 wherein the interface comprises a spring connecting the secondary air bearing to the primary air bearing and a gap is formed between the primary and secondary air bearings.

13. The slider of claim 12, and further comprising:
   a first actuation comb attached to the primary air bearing and lying within the gap; and
   a second actuation comb attached to the secondary air bearing and lying within the gap wherein the first and second actuation combs are interwoven.

14. The slider of claim 13 wherein the first and second actuation combs are electro-static combs.

15. A slider for supporting a transducing head with respect to a surface, the slider comprising:
   (a) a primary air bearing;
   (b) a secondary air bearing comprising a transducing head; and
   (c) a compliant interface that connects the primary air bearing and the secondary air bearing, the compliant interface substantially surrounding the secondary air bearing, wherein the compliant interface reacts to topography of the surface such that the transducing head moves vertically with respect to the primary air bearing to maintain a substantially constant head media spacing between the transducing head and the surface.

16. The slider of claim 15 wherein the compliant interface is less stiff than the primary air bearing.

17. The slider of claim 15 wherein the primary and secondary air bearings comprise a first material and the compliant interface comprises a second material, the first material being more stiff than the second material.

18. The slider of claim 15 wherein the compliant interface has a first surface at a surface opposing face of the primary air bearing, and the slider further comprises at least one spring etched into the first surface of the compliant interface.

19. The slider of claim 15 wherein the primary and secondary air bearings have a first thickness and the compliant interface has a second thickness, the first thickness being greater than the second thickness.

20. The slider of claim 15 wherein the surface is a disc surface and the secondary air bearing modulates in response to local disc surface topography to maintain the head media spacing substantially constant.

* * * * *